United States Patent
Hofmann

[19]

[11] Patent Number: 6,157,092
[45] Date of Patent: Dec. 5, 2000

[54] METHOD AND CIRCUIT CONFIGURATION FOR VOLTAGE SUPPLY IN ELECTRIC FUNCTION UNITS

[75] Inventor: Ludwig Hofmann, Ilmmünster, Germany

[73] Assignee: Siemens Aktiengesellschaft, Munich, Germany

[21] Appl. No.: 09/272,666

[22] Filed: Mar. 18, 1999

Related U.S. Application Data

[63] Continuation of application No. PCT/DE97/02018, Sep. 10, 1997.

[30] Foreign Application Priority Data

Sep. 18, 1996 [DE] Germany ............ 196 38 115

[51] Int. Cl.[7] ............................................. H02J 1/00
[52] U.S. Cl. ................... 307/11; 307/31; 307/39
[58] Field of Search ................... 307/85, 11, 31, 307/39, 86, 38; 340/825; 330/297; 455/574, 228

[56] References Cited

U.S. PATENT DOCUMENTS

| | | | |
|---|---|---|---|
| 4,340,973 | 7/1982 | Umetsu | 455/228 |
| 5,894,415 | 4/1999 | Habegger | 307/85 |
| 5,953,677 | 9/1999 | Sato | 455/574 |

FOREIGN PATENT DOCUMENTS

| | | |
|---|---|---|
| 0 358 166 A2 | 3/1990 | European Pat. Off. . |
| 195 03 361 A1 | 8/1995 | Germany . |
| 44 24 800 A1 | 1/1996 | Germany . |
| 2 284 085 | 5/1995 | United Kingdom . |

OTHER PUBLICATIONS

International Publication No. WO 96/03811 (Estulin et al.), dated Feb. 8, 1996.
"The Advantages of Decentral Power Supplies" (Pagotto), Der Elektroniker No. 2, 1991, pp. 22–26.
"Decentral is 'in'", elektro Automaten 49, No. 4, Apr. 1996.
"Energy–Charged DC–Bus" elektro Automaten 49, No. 4, Apr. 1996.

*Primary Examiner*—Stephen W. Jackson
*Assistant Examiner*—Sharon Polk
*Attorney, Agent, or Firm*—Herbert L. Lerner; Laurence A. Greenberg; Werner H. Stemer

[57] ABSTRACT

A circuit configuration and a method for supplying voltages to an electrically functional unit that has a central voltage source UC and a plurality of circuit elements. Between the central voltage source and the circuit elements, a device assigned to the circuit elements is connected. The device converts the supply voltage, delivered from the central voltage source for the respective circuit elements into a voltage individualized for the circuit elements, and optionally for the circuit element state, and delivers the converted voltage to the circuit elements.

36 Claims, 1 Drawing Sheet

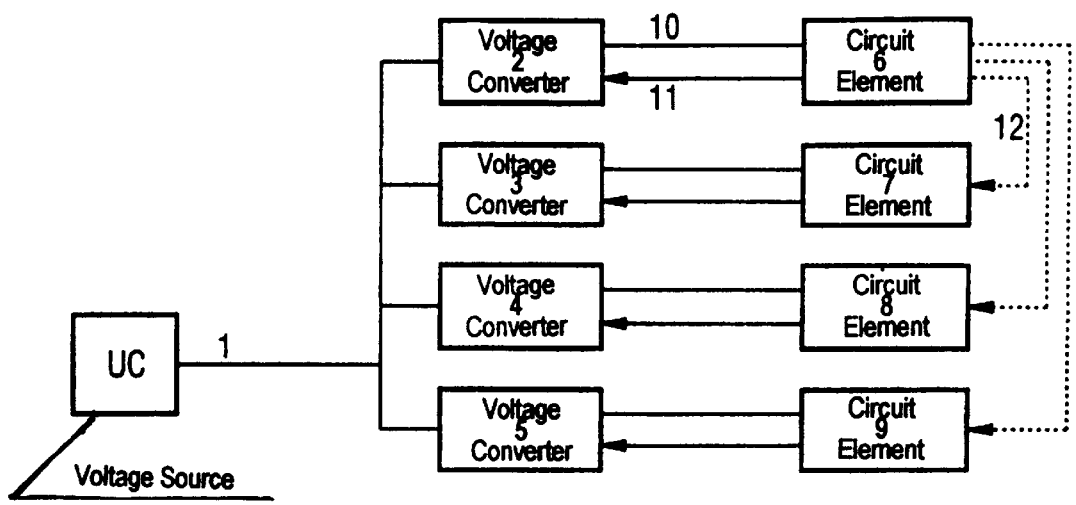
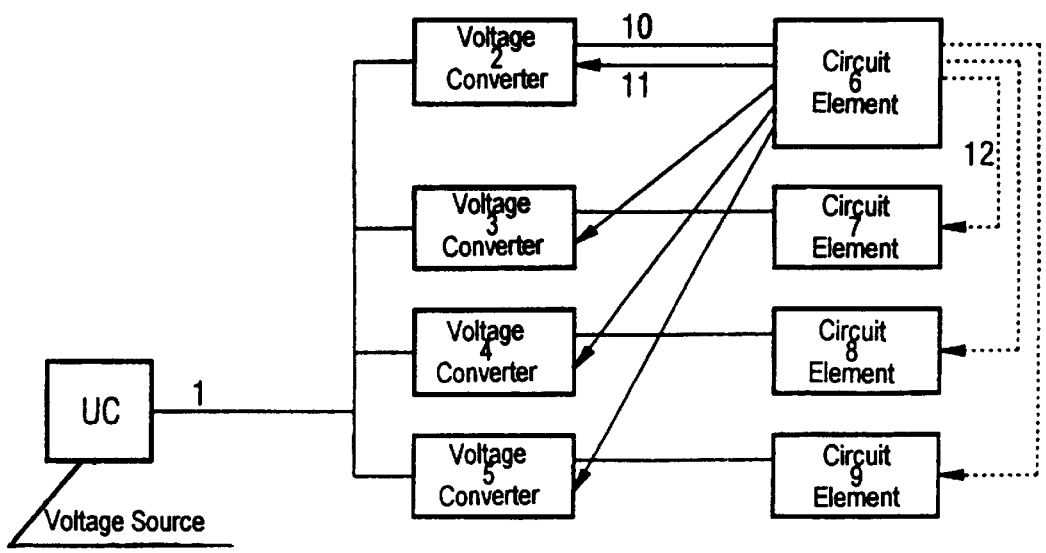

METHOD AND CIRCUIT CONFIGURATION FOR VOLTAGE SUPPLY IN ELECTRIC FUNCTION UNITS

CROSS-REFERENCE TO RELATED APPLICATION

This is a continuation of copending International Application PCT/DE97/02018, filed Sep. 10, 1997, which designated the United States.

BACKGROUND OF THE INVENTION

Field of the Invention

The present invention relates to a circuit configuration and to a method for a voltage supply for electric function units which includes a plurality of circuit elements and are supplied with voltage from a central voltage source. In particular, the invention relates to supplying direct voltage to mobile phones.

In function units, such as mobile phones, that include a plurality of circuit elements, there is often a need to reduce the operating voltage of the particular function unit, for instance so that smaller, lighter batteries can be used. Reducing the operating voltage, however, can lead to manifold problems with the individual circuit elements.

In mobile phones, 3-volt batteries are often used now, instead of the 6-volt or 12-volt voltage supply that was previously conventional. This reduction in operating voltage can lead to a number of problems with individual circuit elements, depending on the construction and the operating state. Reducing the operating voltage means that individual circuit elements can be overridden and thus are no longer operated in the linear range.

Because of the higher current consumption, buffer capacitors must also be made larger, which in turn runs counter to the trend toward miniaturization. Finally, higher currents in general lead to higher line losses. Another considerable disadvantage may be the disproportionately increased noise vulnerability in frequency modulation. Reducing the supply voltage from 12 V to 3 V, at a maximum voltage rise of 2 V and a tuning range of 75 MHz, for instance, leads to modulation and interference sensitivity increased by a factor of 10.

From Published International Patent Disclosure WO A 96 03 811, a circuit configuration for a voltage supply to supply a plurality of circuit elements is known. Between a central voltage source and the circuit elements, a device is connected that converts a voltage supplied from the central voltage source into a circuit-element-individual voltage and delivers that voltage to the circuit elements.

SUMMARY OF THE INVENTION

It is accordingly an object of the invention to provide a method and a circuit configuration for a voltage supply in electric function units that overcome the above-mentioned disadvantages of the prior art devices and methods of this general type.

With the foregoing and other objects in view there is provided, in accordance with the invention, an electrically functional unit requiring and supplying multiple voltage levels, including: a central voltage source outputting a supply voltage; a voltage converter receiving and converting the supply voltage into circuit element individual state voltages; and a plurality of circuit elements each having operating states that require different supply voltages and receiving the different supply voltages from the voltage converter in a form of the circuit element individual state voltages.

The present invention therefore furnishes a circuit configuration for a voltage supply in an electrically functional unit, preferably a mobile phone, made up of a plurality of circuit elements that is supplied with voltage, in particular direct voltage, from a central voltage source. In particular, at least two circuit elements are each assigned a respective device for converting the voltage supplied from the central voltage source, in such a way that the circuit elements are supplied independently from one another with a circuit-element-individual voltage that is thus adapted to the requirements of that particular circuit element. This adaptation can be chronologically fixed or, depending on the current operating state of the circuit element, variable. Therefore, the transmitting end stage, for example, whenever it is transmitting, can be supplied with an increased voltage but otherwise is made currentless or supplied with a reduced general operating voltage.

In a preferred circuit configuration, the circuit elements themselves, preferably as a function of time, output control signals for voltage conversion to the respectively assigned devices for voltage conversion. The circuit configuration can thus be adapted directly to the current operating state of the circuit element.

Another circuit configuration of the invention has as its circuit element a central logic circuit, which forms control signals, preferably as a function of time, for converting the voltage individually in accordance with the circuit element or the state of the circuit element and delivers this voltage to the various devices for voltage conversion.

In a mobile phone, at least the transmitting end stage and the receiver unit are preferably supplied individually with voltage. In addition, other circuit elements, such as the control transmitter or various amplifiers, can also be supplied individually with the required voltage. In the ideal case, all the relevant circuit elements are allocated their optimally adapted supply voltage depending on the operating state. Preferably, switching regulators are used as the devices for direct voltage conversion for the individual circuit elements.

According to the invention, a method is also furnished for supplying voltage to an electric function unit, in particular a mobile phone, made up of a plurality of circuit elements and supplied with voltage, especially direct voltage, from a central voltage source. The voltage furnished by the central voltage source is converted by at least two devices for converting the voltage and assigned each to one circuit element, in accordance with control signals, in such a way that the converted voltage carried at a specific time to a circuit element meets the demands of the circuit element. This control is preferably time-dependent, or in other words dependent on the operating state at the time. The particular demand is as a rule defined beforehand in a performance graph for certain operating states. However, it is also possible to provide dynamic adaptation to varying operating states, such as a further increase, for a limited time, for instance, in the supply voltage for the transmitter end stage when operation is relatively long-lasting or requires especially high power. The complexity of control of the individual voltage supply depends essentially on the technical demands made of the equipment and on the desired economy of the embodiment.

As described above, in principle, an arbitrary number of circuit elements, or all the circuit elements, can be supplied individually with voltage. Circuit elements of mobile phones according to the invention are preferably supplied with different voltages and thus with voltages that are varied, include along with the transmitter end stage transmitters and receivers and the voltage control oscillator. For direct voltage conversion, switching regulators are preferably used within the context of the scope of the method of the invention.

Within the scope of the invention, many kinds of controls can be implemented. Preferably, however, the direct voltage conversions are performed in accordance with control signals that are output in time and component-dependent fashion to the devices for voltage conversion by a central logic circuit. In a further preferred method, the control signals are output in time-dependent fashion by the various circuit elements to the various associated devices for direct voltage conversion.

Other features which are considered as characteristic for the invention are set forth in the appended claims.

Although the invention is illustrated and described herein as embodied in a method and a circuit configuration for voltage supply in electric function units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a first embodiment of a circuit configuration with a decentralized voltage control according to the invention; and FIG. 2 is a block circuit diagram of a second embodiment of the circuit configuration with the centralized voltage control.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a block circuit diagram with decentralized voltage control for various circuit elements of a mobile phone. The mobile phone includes a central direct voltage source UC formed for example by a battery of approximately 2.7 to 3.6 V, circuit elements 6–9, and supply units 2–5 being voltage converters for voltage conversion. The supply units 2–5 are disposed between the central voltage source UC and the circuit elements 6–9, and each supply unit 2–5 is assigned to one circuit element 6–9.

In operation, the direct supply voltage UC is applied via a line 1 to the supply units 2–5 of the circuit elements 6–9. In the exemplary embodiment shown in FIG. 1, the circuit element 6 is a logic circuit, which via control lines 12 controls the other circuit elements 7–9, such as a receiver/transmitter unit, a transmitter end stage, and a voltage control oscillator.

The circuit elements 6–9 are supplied via lines 10, by the respective associated supply units 2–5, with circuit-element-individual voltage, for instance of 3V/2V, 4V/2V, 20V/10V and 5V/3V, for instance; the two voltages given in each case pertain to different operating states.

The circuit-element-individual voltage can be variable over time and can depend on operating states of the applicable circuit element; the circuit element requires different supply voltages in the various operating states. For instance, the circuit element 6, which can be embodied as a logic circuit (FIG. 2), requires a supply voltage of 1.5 V in an operating state known as "battery buffer and real-time clock", a supply voltage of 2 V in a "standby" operating state, and a supply voltage of 3 V in the "full power" operating state.

A circuit element 7, which may be embodied as a voltage controlled oscillator, requires a supply voltage of 4 V in an "active" operating state and a supply voltage of 2 V in an "inactive" operating state. A circuit element 8, which may be embodied as a transmitter end stage, requires a supply voltage of 20 V in a "transmitting" operating state and a supply voltage of 10 V in an "off" operating state.

Via control lines or connection paths 11, the circuit elements 6–9 send control signals to their associated supply units 2–5. Each of the control signals contains information that designates the supply voltage required for an individual circuit element 6–9 or circuit element state.

The supply units 2–5 include a device for converting the direct voltage supplied by the central voltage source UC; this device is preferably a Maxim MAX 608. Within the scope the present invention, one or more control lines 11 can also be dispensed with, if there is a fixed step-up ratio between the voltage supplied by the central voltage source UC and the voltage to be delivered to the circuit elements.

FIG. 2 shows a block circuit diagram of a second embodiment of the circuit configuration of the invention.

Unlike the circuit configuration shown in FIG. 1, here all the control lines 11 connect the logic circuit 6 to the supply units 2–5. The logic circuit 6 specifies information about the operating states to the circuit elements 7–9 and controls the corresponding units 2–5 in accordance therewith.

I claim:

1. An electrically functional unit, comprising:
   a central voltage source outputting a supply voltage;
   a plurality of circuit elements each having operating states requiring different supply voltages; and
   a voltage converter connected to and supplying said different supply voltages to said plurality of circuit elements, said voltage converter receiving and converting said supply voltage from said central voltage source into said different supply voltages required by said plurality of circuit elements in dependence on an operating state of each of said plurality of circuit elements.

2. The electrically functional unit according to claim 1, wherein said voltage converter is a controllable voltage converter.

3. The electrically functional unit according to claim 1, wherein a ratio between said supply voltage outputted by said central voltage source and said different supply voltages received by said plurality of circuit elements is fixed.

4. The electrically functional unit according to claim 2, wherein said controllable voltage converter is controlled by at least one of said plurality of circuit elements.

5. The electrically functional unit according to claim 1, wherein one of said plurality of circuit elements is a controller controlling said voltage converter.

6. The electrically functional unit according to claim 5, wherein at least some of said plurality of circuit elements are controlled by said controller.

7. The electrically functional unit according to claim 1, wherein said voltage converter is a switching controller.

8. The electrically functional unit according to claim 1, wherein said plurality of circuit elements, said central voltage source and said voltage converter form a mobile phone.

9. The electrically functional unit according to claim 1, wherein one of said plurality of circuit elements is a transmitter unit.

10. The electrically functional unit according to claim 1, wherein one of said plurality of circuit elements is a receiver unit.

11. The electrically functional unit according to claim 1, wherein said central voltage source is a direct voltage source.

12. In combination with an electrically functional unit having a plurality of circuit elements requiring multiple voltage levels, a circuit configuration for supplying the multiple voltage levels, comprising:

a central voltage source outputting a supply voltage;

the plurality of circuit elements each having operating states requiring different supply voltages;

a voltage converter connected to and supplying said different supply voltages to the plurality of circuit elements, said voltage converter receiving and converting said supply voltage from said central voltage source into said different supply voltages required by the plurality of circuit elements in dependence on an operating state of each of the plurality of circuit elements.

13. The circuit configuration according to claim 12, wherein said voltage converter is a controllable voltage converter.

14. The circuit configuration according to claim 12, wherein a ratio between said supply voltage outputted by said central voltage source and said different supply voltages received by the plurality of circuit elements is fixed.

15. The circuit configuration according to claim 13, wherein said controllable voltage converter is controlled by the plurality of circuit elements.

16. The circuit configuration according to claim 12, wherein one of the plurality of circuit elements is a controller controlling said voltage converter.

17. The circuit configuration according to claim 16, wherein at least some of the plurality of circuit elements are controlled by said controller.

18. The circuit configuration according to claim 12, wherein said voltage converter is a switching controller.

19. The circuit configuration according to claim 12, wherein the plurality of circuit elements, said central voltage source and said voltage converter form a mobile phone.

20. The circuit configuration according to claim 12, wherein one of the plurality of circuit elements is a transmitter unit.

21. The circuit configuration according to claim 12, wherein one of the plurality of circuit elements is a receiver unit.

22. The circuit configuration according to claim 12, wherein said central voltage source is a direct voltage source.

23. An improved method for supplying a voltage to an electrically functional unit, the electrically functional unit having a central voltage source outputting a supply voltage, a plurality of circuit elements, and a voltage converter disposed between the central voltage source and the plurality of circuit elements, the voltage converter receiving the supply voltage from the central voltage source, the improvement which comprises:

converting the supply voltage delivered by the central voltage source into different supply voltages for each of the circuit elements in dependence on operating states of the circuit elements as each of the operating states require differing supply voltages.

24. The method according to claim 23, which comprises:

controlling the voltage converter by at least one of the plurality of circuit elements outputting a control signal to the voltage converter, the control signal being dependent on the operating states of the plurality of circuit elements; and converting the supply voltage into the different supply voltages for each of the plurality of circuit elements in dependence on the control signal for supplying an individualized voltage for each circuit element state of each circuit element.

25. The method according to claim 23, which comprises:

controlling the voltage converter with a controller outputting a control signal, the control signal being dependent on the operating states of the plurality of circuit elements; and converting the supply voltage into the different supply voltages for each of the plurality of circuit elements in dependence on the control signal for supplying an individualized voltage for each circuit element state of each circuit element.

26. An electrically functional unit, comprising:

a central voltage source outputting a supply voltage;

plurality of circuit elements each having operating states requiring different supply voltages; and a plurality of voltage converters, one of said voltage converters connected to and supplying said different supply voltages to one of said plurality of circuit elements, said voltage converters each receiving and converting said supply voltage from said central voltage source into said different supply voltages required by each of said plurality of circuit elements in dependence on an operating state of each of said plurality of circuit elements.

27. The electrically functional unit according to claim 26, wherein said voltage converters are controllable voltage converters.

28. The electrically functional unit according to claim 26, wherein a ratio between said supply voltage outputted by said central voltage source and said different supply voltages received by said plurality of circuit elements is fixed.

29. The electrically functional unit according to claim 27, wherein said controllable voltage converters are controlled by at least one of said plurality of circuit elements.

30. The electrically functional unit according to claim 26, wherein one of said plurality of circuit elements is a controller controlling said voltage converter.

31. The electrically functional unit according to claim 30, wherein at least some of said plurality of circuit elements are controlled by said controlleer.

32. The electrically functional unit according to claim 26, wherein said voltage converters are switching controllers.

33. The electrically functional unit according to claim 26, wherein said plurality of circuit elements, said central voltage source and said voltage converters form a mobile phone.

34. The electrically functional unit according to claim 26, wherein one of said plurality of circuit elements is a transmitter unit.

35. The electrically functional unit according to claim 26, wherein one of said plurality of circuit elements is a receiver unit.

36. The electrically functional unit according to claim 26, wherein said central voltage source is a direct voltage source.

* * * * *